RICHARD R. COUNCILMAN
ROLAND A. FREEMAN
INVENTORS

BY Robert M. Sperry

ATTORNEY

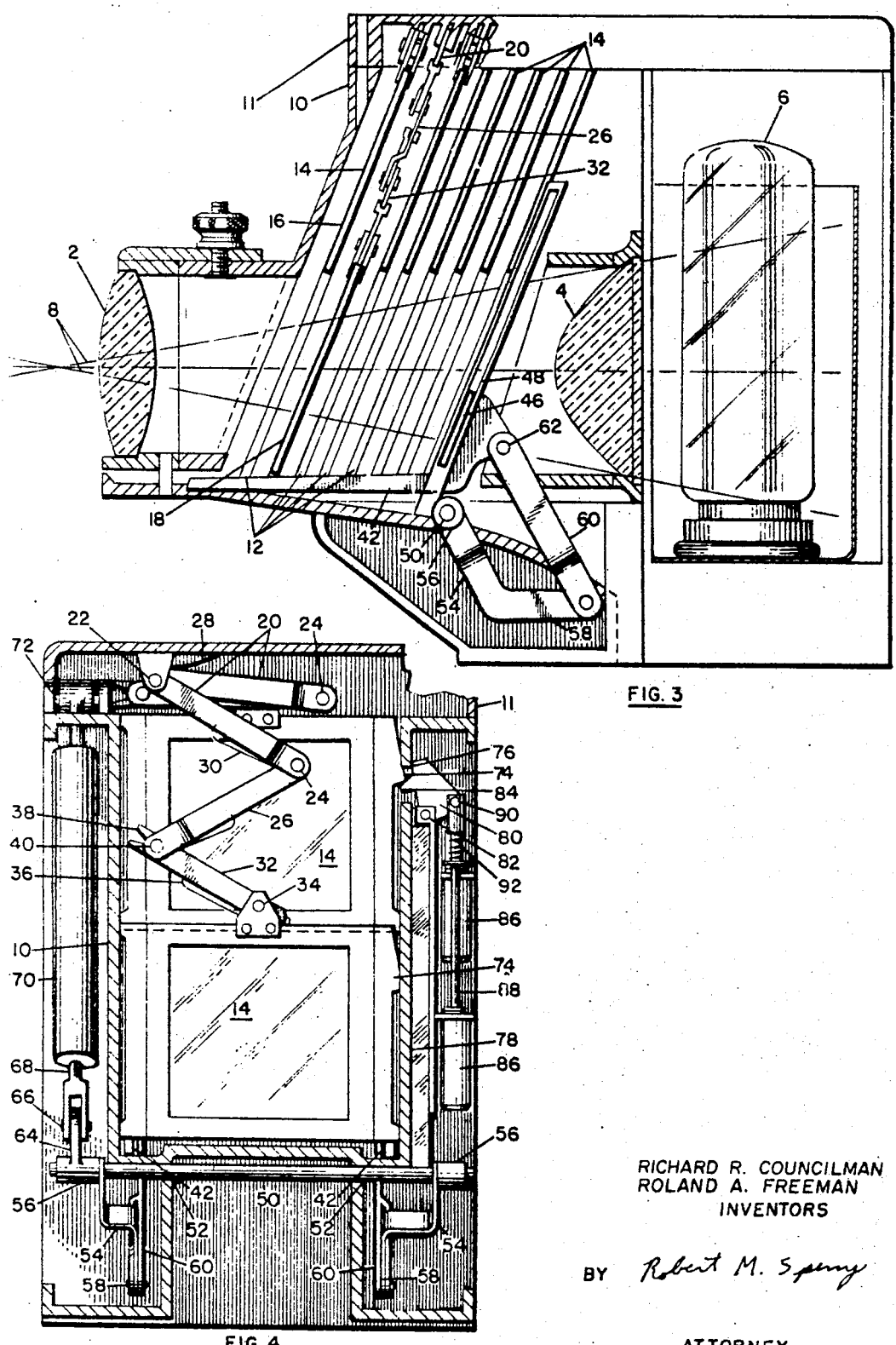

United States Patent Office 3,382,024
Patented May 7, 1968

3,382,024
OPTICAL FILTER CHANGING MECHANISM
Richard R. Councilman, Garland, and Roland A. Freeman, Arlington, Tex., assignors to Ling-Temco-Vought, Inc., Dallas, Tex., a corporation of Delaware
Filed Aug. 6, 1964, Ser. No. 387,896
2 Claims. (Cl. 350—315)

ABSTRACT OF THE DISCLOSURE

Mechanism for selectively interposing any of a plurality of filters between the illuminator and the optical system of a slide projector or the like. A plurality of filters are resiliently biased toward an operative position but are held in a storage position by selectively operable latch means and means are provided for returning filters from the operative position to the storage position.

This invention relates to optical devices, such as slide projectors, and is particularly directed to novel mechanism for selectively interposing any of a plurality of color filters or the like between the illuminator and the optical system of a slide projector or the like.

In slide projectors, signal lamps, flood lights and the like, it is often desired that the projected light be a particular color. Moreover, it is sometimes desirable to change colors. To accomplish this, it is customary to provide a white light source together with one or more colored filters to pass only light of the desired color. Frequently, a plurality of filters are provided in a container which is independent of the projector and the operator must manually select the desired filter and manually position it to intercept the projected beam of light. This procedure is time consuming and, where the aiming of the projector is critical, this manual operation may displace the projector. To overcome these disadvantages numerous types of automatic filter changing devices have been proposed. However, none of the prior art filter changing devices have been entirely satisfactory. Many of the prior art devices are cumbersome in size, unreliable and slow in operation, and inaccurate in positioning the filter. Furthermore, many of the prior art filter changing devices still require manual selection of the desired filter.

These disadvantages of the prior art are overcome with the present invention and novel filter changing mechanism is provided which is compact in size, smooth and rapid in operation, reliable and accurate, and permits completely automatic selection and positioning of the filters.

The advantages of the present invention are preferably attained by providing novel filter changing mechanism comprising a support having front and rear apertures through which a beam of light to be filtered may pass, a plurality of filters, a plurality of pairs of guide members on said support to guide movement of said filters between a storage position and a filtering position, means urging each of said filters to said filtering position, transport means for moving said filters, actuator means operable to cause said transport means to move said filters to said storage position, a plurality of latch means each serving to lock a respective one of said filters in said storage position, and means for selectively actuating any of said latch means to release the associated filter.

Accordingly, it is an object of the present invention to provide novel filter changing mechanism.

Another object of the present invention is to provide novel filter changing mechanism which automatically selects and positions a desired filter.

A further object of the present invention is to provide novel filter changing mechanism which is compact in size, smooth and rapid in operation, and which is accurate and reliable.

A specific object of the present invention is to provide novel filter changing mechanism comprising a support having front and rear apertures through which a beam of light to be filtered may pass, a plurality of filters, a plurality of pairs of guide members on said support to guide movement of said filters between a storage position and a filtering position, transport means for moving said filters, actuator means operable to cause said transport means to move said filters to said storage position, a plurality of latch means each serving to lock a respective one of said filters in said storage position, and means for selectively actuating any of said latch means to release the associated filter.

These and other objects and features of the present invention will be apparent from the following detailed description taken with reference to the figures of the accompanying drawings.

In the drawings:

FIGURE 3 is a vertical section taken on the line III—III of FIGURE 2; and

FIGURE 4 is a transverse section taken on the line IV—IV of FIGURE 2.

Figure 2:
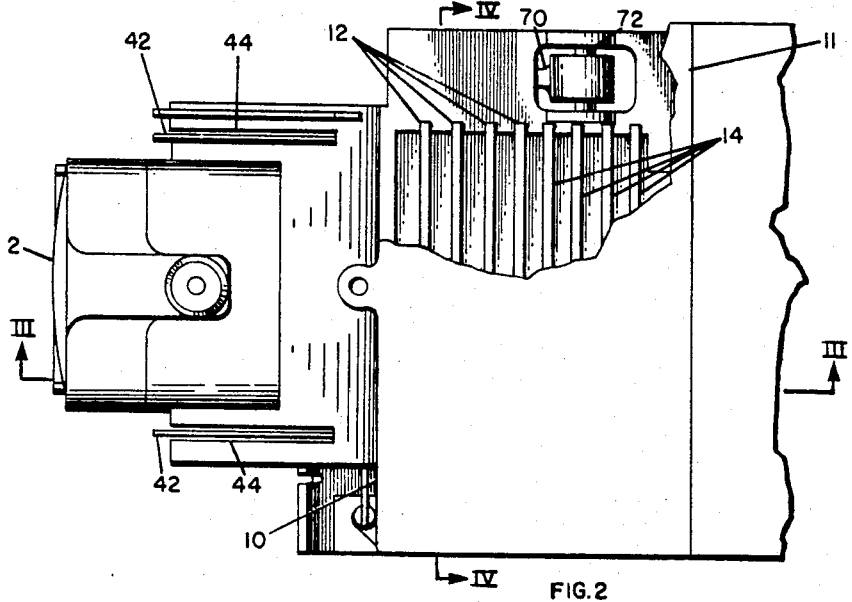
FIGURE 2 is a plan view of the device of FIGURE 1 with the cover plate partially removed.
Figure 1:
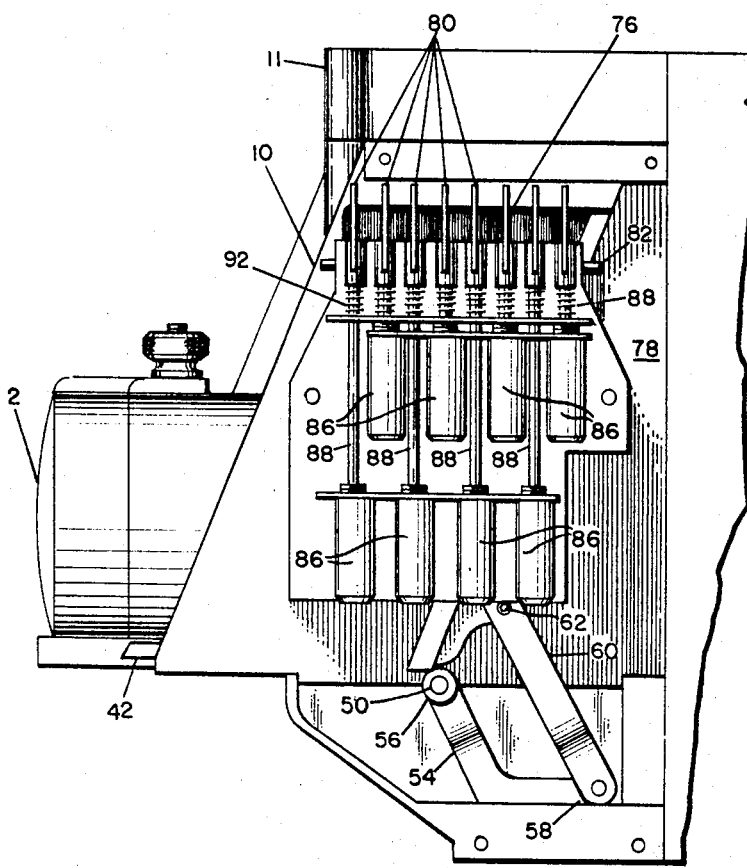
FIGURE 1 is a side elevation of a projection device embodying the filter changer of the present invention.

In the form of the present invention chosen for purposes of illustration in the drawings, the filter changing mechanism is shown mounted between lenses 2 and 4 of the optical system of a projection device. For simplicity, the projection device is shown as a floodlight having a lamp 6 providing light which is focused and projected by the lenses 2 and 4, as indicated by broken lines 8. It will be obvious to those skilled in the art that the filter changing mechanism could be employed equally well with other projection devices, such as slide projectors, motion picture projectors, signal lamps, and the like.

The filter changing mechanism comprises a housing 10 formed with a plurality of inclined slots 12 which serve to guide movement of filters 14 between a raised, storage position, as indicated at 16 in FIG. 3, and a lower, filtering position, indicated at 18. Spring biased link means are provided for each of the filters 14 to urge the filters 14 to the lower position 18. Thus, as seen in FIG. 4, link 20 has one end 22 pivotally secured to the cover 11 of housing 10 and has the other end 24 pivotally connected to a second link 26. Spring means 28 and 30 are provided to urge links 20 and 26 to an extended position. In addition, the filter 14 has an arm member 32 pivotally mounted on the top thereof, as seen at 34, and spring means 36 urge the arm member 32 toward a vertical position. To couple the filter 14 to the links 20 and 26, while permitting ready replacement of the filter 14, the upper end 38 of arm member 32 is bifurcated and engages a pin 40 carried by the free end of link 26. To replace any of the filters 14, cover 11 of housing 10 is removed, carrying with it the link means 20 and 26. The appropriate filter is slipped out of its guide slots 12 and a new filter is inserted. Each pin 40 is then engaged with the ends 38 of a respective one of the filters 14 and the cover 11 is replaced.

To transport the filters 14 to the raised, storage position, a pair of generally L-shaped finger members 42 are provided adjacent opposite sides of housing 10. The front end of each of the finger members 42 is slideably received by a respective vertical slot 44 formed in the front of housing 10, while the upwardly extending inner end is provided with a laterally projecting dog 46 which is slideably received in a slot 48 formed adjacent the rear of the housing 10 and extending parallel to the guide slots 12. To actuate the fingers 42, a shaft 50 extends transversely across the housing 10 and is rotatably received by apertures 52. A pair of generally L-shaped lever members 54 are provided adjacent opposite ends of the shaft 50 and each of the lever members 54 has one end 56 secured to the adjacent end of shaft 50 to cause lever members 54 to be rotatable with shaft 50. The free end 58 of each lever member 54 is pivotally connected to a respective link 60 which, in turn, is pivotally connected to the adjacent finger member 42, as seen at 62. In addition, one of the lever members 54 is provided with an extension, as shown at 64 in FIG. 4, which is pivotally coupled at 66 to a piston 68 driven by a suitable actuator 70, such as a solenoid, mounted on the housing 10, as by pivot 72.

In operation, energizing actuator 70 causes piston 68 to be extended and acts through extension 64 to rotate shaft 50 and lever members 54. This motion is transmitted through links 60 and serves to drive finger members 42 upward under the guidance of slots 44 and 48. As seen in FIGS. 3 and 4, the filters 14 rest upon finger members 42 when the filters 14 are in the lower position 18. Thus, when finger members 42 are moved upward, the filters 14 will be carried upward to the raised position 16. To retain the filters 14 in the raised position 16, each of the filters 14 is formed with an ear 74 which cooperates with the slots 12 to guide movement of the filter 14. In addition, an opening 76 is formed in the wall 78 of housing 10 and a plurality of latch members 80 are pivotally mounted adjacent opening 76, as by shaft 82. Each of the latch members 80 is formed with a dog 84 which, in the latching position, projects through opening 76 and engages the ear 74 of a respective filter 14 to retain the filter 14 in the raised storage position 16. To actuate latch members 80, a plurality of actuators, such as solenoids 86, are mounted on the housing 10 and each of the actuators 86 drives a piston 88 which is pivoted, as seen at 90 in FIG. 4, to a respective one of the latch members 80. When energized, the solenoids 86 act to draw the associated pistons 88 downward causing the respective latch member 80 to pivot about shaft 82 and disengaging dog 84 from the ear 74 of the filter 14. This allows the spring biased link means 20, 26 and 32 to drive the filter 14 to the lower filtering position 18. When the filters 14 are lifted by fingers 42 to the raised storage position, springs 92 urge the latch members 80 into the latching position causing dogs 84 to engage the ears 74 of the filters 14 to retain the filters 14 in the raised storage position 16.

With the filters 14 in the raised storage position 16, suitable means, not shown, may be provided to selectively actuate the solenoids 86 to release any desired one of the filters 14. As described above, the spring biased link means 20, 26 and 32 will then act to drive the desired filter 14 downward to the lower filtering position 18. To change filters, solenoid 70 is actuated to cause fingers 42 to lift the filter 14 to the raised storage position where it will be retained by latch member 80. Solenoid 70 is then deenergized, allowing fingers 42 to return to the lower position. The apparatus is then ready for the release of another one of the filters 14 in the manner described.

Numerous variations and modifications may obviously be made without departing from the present invention. Accordingly, it should be clearly understood that the form of the present invention described above and shown in the figures of the accompanying drawings is illustrative only and is not intended to limit the scope of the invention.

What is claimed is:

1. Filter changing mechanism comprising:
   a support having front and rear apertures through which a beam of light to be filtered may pass;
   a plurality of pairs of slots formed on opposite sides of said support;
   a plurality of filters each slideable within a respective pair of said slots between a filtering position and a storage position,
   said filters each being formed with an ear cooperating with said slots to guide movement of said filters and each of said filters being provided with an arm member having one end thereof pivotally secured to the top of the respective filter and biased toward a vertical position and having the free end of said arm member formed bifurcated;
   a plurality of resiliently biased members each engageable with the free end of the arm member of a respective one of said filters and serving to urge said respective one of said filters to said filtering position;
   transport means for moving said filters;
   first actuator means operable to cause said transport means to move said filters from said filtering position to said storage position;
   a plurality of latch means each formed with a dog engageable with the ear of a respective one of said filters to lock said respective one of said filters in said storage position;
   resilient means urging each of said latch means to its locking position;
   a plurality of second actuator means each operable to cause a respective one of said latch means to release the associated filter; and
   means for selectively operating any of said actuator means.

2. Filter changing mechanism comprising:
   a support having front and rear apertures through which a beam of light to be filtered may pass;
   a plurality of pairs of filter guiding slots formed on opposite sides of said support;
   a plurality of filters each slideable within a respective pair of said filter guiding slots between a filtering position and a storage position,
   said filters each being formed with an ear cooperating with said filter guiding slots to guide movement of said filters and each of said filters being provided with an arm member having one end thereof pivotally secured to the top of the respective filter and biased toward a vertical position and having the free end of said arm member formed bifurcated;
   a plurality of resiliently biased members each engageable with the free end of the arm member of a respective one of said filters and serving to urge said respective one of said filters to said filtering position;
   second slot means formed in said support;
   finger means extending beneath said filters and slideable within said second slot means to move said filters;
   first actuator means having a piston operable between a retracted position and an extended position;
   linkage means coupling said piston to said finger means to cause said finger means to move said filters to said storage position when said piston moves to said extended position and to cause said finger means to move to a position beneath said filtering position when said piston moves to said retracted position;

a plurality of latch means each formed with a dog engageable with the ear of a respective one of said filters to lock said respective one of said filters in said storage position;

resilient means urging each of said latch means to its locking position;

a plurality of second actuator means each operable to cause a respective one of said latch means to release the associated filter; and means for selectively operating any of said actuator means.

References Cited

UNITED STATES PATENTS

| | | |
|---|---|---|
| 1,729,163 | 9/1929 | Drew. |
| 3,107,578 | 10/1963 | Engelage _____ 350—315 |
| 3,255,666 | 6/1966 | Davis et al. _____ 350—315 |

DAVID H. RUBIN, *Primary Examiner.*

M. J. TOKAR, *Assistant Examiner.*